Feb. 12, 1963  R. A. CAMPBELL  3,077,413
CERAMIC FIBER PRODUCTS AND METHOD AND APPARATUS
FOR MANUFACTURE THEREOF
Filed Feb. 27, 1957

INVENTOR.
Robert A. Campbell
BY Webb, Mackey & Burden
HIS ATTORNEYS 3,077,413
CERAMIC FIBER PRODUCTS AND METHOD AND
APPARATUS FOR MANUFACTURE THEREOF
Robert A. Campbell, Oak Park, Ill., assignor to The
Carborundum Company, Niagara Falls, N.Y., a corporation of Delaware
Filed Feb. 27, 1957, Ser. No. 642,906
4 Claims. (Cl. 106—38.9)

The present invention relates to a method and apparatus for forming ceramic fiber products bonded with colloidal silica and the products produced thereby.

Ceramic fibers have limited utility due to the unavailability of an inexpensive and abundant binder for use in fabricating a molded product from the fibers. Numerous binders have been used in the past but none have proved entirely satisfactory from the standpoint of ease of application, binding ability, availability, and cost.

The present invention overcomes the above difficulties by providing an inexpensive and readily available binder composed of colloidal silica. The colloidal silica is easily applied to and rigidly binds the ceramic fibers into a mass adaptable to many commercial uses.

It is well known to coat glass fibers with colloidal silica and unite the silica with the fibers by heat treatment. The normally smooth surfaced fibers are thereby delustered and slippage between fibers is reduced due to the new roughened surfaces. The patent to Caroselli, No. 2,754,224, illustrates this known process. However, this known process is not directed to the fabrication of a molded product by consolidation through pressure and heat of ceramic fibers saturated with colloidal silica.

The present invention also relates to a colloidal silica bonded ceramic fiber product having a substantially smooth surface. The interstices between the fibers are filled with colloidal silica in this product. It is necessary that the fibers be closely spaced and that the ratio of colloidal silica to fibers be high to produce a product of this type.

In the drawings, I have illustrated a present preferred embodiment of my invention in which.

Figure 1:
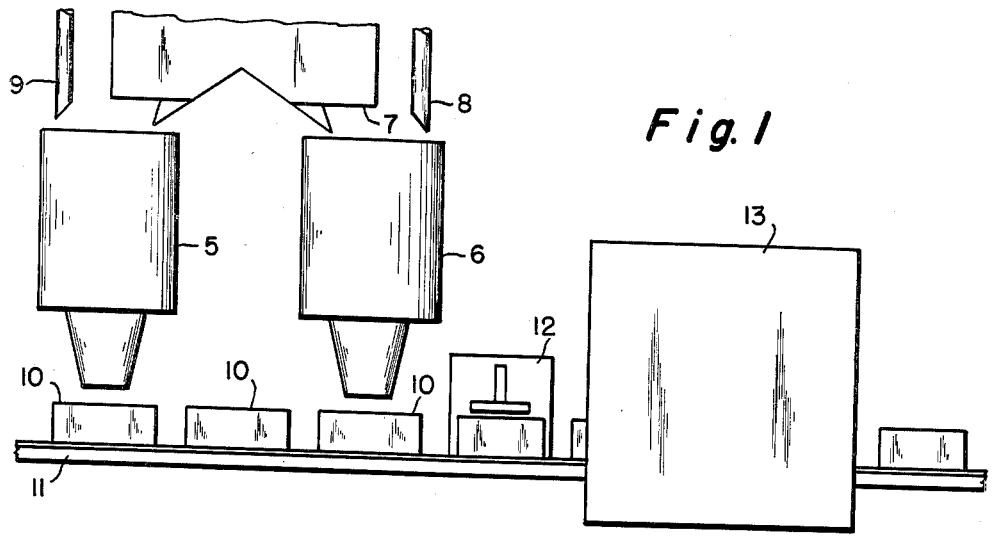
FIGURE 1 is a side view of a production line for molding a mixture of ceramic fibers and colloidal silica.

Briefly, the present invention consists of saturating or impregnating ceramic fibers with a colloidal silica solution, forming the saturated ceramic fibers into any desired shape or maintaining the fibers in the shape in which they were saturated, and drying the ceramic fiber shape. The quantity of colloidal silica added to the ceramic fibers can be regulated to yield a product of varied flexibility and strength. Normally, the finished product contains from 10 to 50 parts by volume of colloidal silica per 100 parts by volume of ceramic fibers.

The ceramic fibers are intermingled with the colloidal silica by mixing the ceramic fibers into the colloidal silica solution with a mechanical mixer; by immersing or dipping the ceramic fibers in the colloidal silica solution; or by spraying the ceramic fibers with the colloidal silica solution.

After saturation or impregnation of the ceramic fibers with the colloidal silica solution, the mass is formed by any conventional means such as dies (unheated or heated), molds, extrusion, bulk forming, rolling (unheated or heated rolls), centrifugal spinning, or the mass is sprayed on a form or pattern.

Ceramic fibers that are preferred consist primarily of aluminum silicate, with small amounts of oxides such as $Na_2O$ and $B_2O_3$ or $ZrO_2$ and other trace oxides, and are sold under the trademark "Fiberfrax". These fibers are fireproof and withstand temperatures up to 3000° F.

The colloidal silica solution or dispersion that is preferred is supplied at a 30% concentration of silica under the registered trademark "Ludox." This dispersion of colloidal silica has the following physical properties and approximate chemical compositions:

| | |
|---|---|
| SiO | 29–31%. |
| $Na_2O$ | 0.09–0.11%. |
| $Na_2SO_4$ | 0.02%. |
| pH at 25° C | 8.2–8.7. |
| Viscosity at 25° C | 25–50 centipoises. |
| Freezing point | 32° F. (silica irreversibly precipitated). |

Details regarding the characteristics of the colloidal silica that can be used can be obtained from publications and from United States patents, including, for example, 2,527,329, granted October 24, 1950; and 2,597,871, granted May 27, 1952. These publications indicate that the approximate particle diameter of the colloidal silica particles, in "Ludox" colloidal silica dispersions, is about 15 m$\mu$, and that the dispersion has a viscosity at 25° C. of 25.0 to 50.0 cps., and a pH at 25° C. of 8.2 to 8.7.

In general, the aqueous colloidal silica dispersions that can be used are prepared by following the teachings of the Bird United States Patent 2,244,325; i.e., sodium silicate solution is passed through an acid-regenerated ion exchange resin, to remove the sodium ions from the silicate and replace them with hydrogen ions. The effluent from the ion exchanger may be evaporated to obtain the desired concentration of colloidal silica in the dispersion. The characteristics of several satisfactory stable aqueous dispersions of colloidal silica are described in "The Colloidal Chemistry of Silica and Silicates," by Ralph K. Iler, Cornell University Press, Ithaca, New York, 1955.

In this application, the terms solution and dispersion are used interchangeably, in reference to colloidal silica in an aqueous vehicle, as is customary in this art.

The ceramic fibers are called "loose wool or cotton" when in bulk form prior to forming into mats or paper. In one process according to this invention, the "loose wool or cotton" ceramic fibers are saturated or impregnated with a colloidal silica solution by mixing them with the solution in a vat by means of a mechanical paddle mixer. The concentration of colloidal silica in the solution can vary depending upon the strength and flexibility desired in the final product; however, a 10% dispersion of colloidal silica in water has been found to produce a very desirable end product.

As shown in FIGURE 1, the mixing vats 5 and 6 are filled from a ceramic fiber hopper 7 and colloidal silica solution outlets 8 and 9. Two mixing vats are provided, one beside the other, so that one vat can be feeding into molds while the other vat is homogenizing the mixture of fibers and solution. A concentration of 6–7% fiber is used in the mixture. After thorough mixing, the mixture is introduced into open top molds 10 having screen bottoms to allow drainage. The sides of the mold are lined with aluminum foil or coated with silicones to prevent sticking. The filled molds are moved on a conveyor 11 to a tamping position 12 where the mixture is tamped, pressed, trowelled and rolled to a semi-solid state for removal of air inclusions to yield a better surface on the finished product. Sufficient packing should be done so that when the mold is removed, slumping of the block side walls will not occur. The cast block is then conveyed to an oven 13 where it is heated at temperatures between 300° F. to 500° F. to drive off the water in the mixture and yield a product of the desired properties.

The final product from this process preferably contains about 50 parts by volume of ceramic fibers to 25 parts by volume of colloidal silica.

From the above procedure, it can be surmised that a considerable amount of water is left in the block to be removed in the drying process. In actual practice, a weight ratio of about 5.5 parts of the aqueous colloidal silica to 1 part fiber is present in the block ready for drying. This feature was taken advantage of in the work with colloidal silica in calculating the quantity of silica (dry basis) remaining in the cast block when ready to dry, and assuming that this silica would remain in the block when the water had been evaporated. Dispersions of colloidal silica at various concentrations of colloidal silica in water were made up, and the following data lists the concentration of silica (dry basis) in the dispersion before addition of fiber, and the calculated concentration of silica in the block after drying.

TYPICAL MIX

| | Lbs. |
|---|---|
| Silica (dry basis) | 9.3 |
| Water | 100.7 |
| Ceramic fiber (dry basis) | 6.6 |

This mix produces a block when dried containing between 40–45% silica solids based on the fiber, taking into account the fact that 35 lbs. of the dispersion of colloidal silica is left in the block after casting.

Mixes

| No. | Silica | Water | Weight Percent Silica in the dispersion | Weight Percent Silica in block based on fiber |
|---|---|---|---|---|
| 1 | .66 | 107 | .62 | 3.27 |
| 2 | 1.32 | 107 | 1.24 | 6.54 |
| 3 | 2.64 | 107 | 2.48 | 13.08 |
| 4 | 1.2 | 108.8 | 1.09 | 5 |
| 5 | 2.41 | 107.6 | 2.19 | 10 |
| 6 | 4.82 | 105.2 | 4.38 | 20 |
| 7 | 9.65 | 100.4 | 8.78 | 40 |

Mixes 3, 5, 6, and 7 showed a common characteristic of hard outer surface and soft resilient inner structure. Mixes 1, 2, and 4 were quite weak and had a soft crust on the outer surface, indicating insufficient bond for practical use. In all cases, migration of the colloidal silica bond was noticeable from the outside crust, the degree of hardness dependent on the silica present.

Samples were taken from a block made from mix No. 7, and tested for strength. Modulus of rupture determinations were made on samples of 1″ thick, 6″ wide, and 10″ span. Data as follows:

| Type | Density, lb./cu. ft. | Modulus of Rupture, p.s.i. |
|---|---|---|
| Crust removed | 13 | 13.7 |
| Crust remaining | 17 | 66.2 |

A number of blocks were made up using mix No. 7 as basic mix. In the procedure described above, from 110 lbs. of the colloidal silica dispersion, 35 lbs. was left in the block for drying, and 75 lbs. of the dispersion of colloidal silica were drained off. This drainage contains the same concentration of colloidal silica as left in the block, and can be used over again to make other blocks; for this purpose, make-up quantities of the dispersion must be added to replace that left in the block cast just previously. Tests were made on the material drained during the making of 25 blocks, and data on the content of colloidal silica in this material, (dry basis) is as follows:

| | Percent silica |
|---|---|
| (1) Silica/water dispersion, start | 8.8 |
| (2) Silica/water dispersion, drained from block | 8.8 |
| (3) Silica/water dispersion, replacement made to 2 | 9.09 |
| (4) Silica/water dispersion, drained from 13th block, replacement having been made after each block | 7.7 |

This data indicates that there is no additional loss of silica due to the ceramic fiber having an inherent affinity for colloidal silica, and the bonding action of colloidal silica comes about primarily from the drying action and removal of water from a cast block.

The colloidal silica-ceramic fiber mixture can also be used in casting insulation in situ or in simple shapes.

For commercial acceptability, low density of insulation has inherent advantages. However, if the density of cast insulation is increased to 18–20 pounds per cubic foot by heavy packing or ramming, the insulation will conform to simple shapes such as cylinders and hold the shape in wet or undried state.

Casting in the above manner involves the use of a 10% colloidal silica dispersion—90% being water. Fiber is added to the dispersion and a slurry formed by agitation. Generally, the fiber content of the slurry is about 5%, but this concentration can be varied from 1% to 15%, depending on the type of mixer available. The concentration of the colloidal silica in the dispersion can also be varied from 1% to 30%, depending on the degree of hardness of the finished product that is required for a given application. A typical mixture for casting insulating material is as follows:

| | Lbs. |
|---|---|
| Colloidal silica (dry basis) | 816 |
| Water | 7,444 |
| Ceramic fiber (dry basis) | 408 |

This mixture is cast in situ at the place of use or rammed into molds having simple shapes. The mixture is then dried to remove the water and yield a bonded product.

In castable insulation, as in block work described above, the material that drains from the cast slurry or mixture contains the same concentration of colloidal silica as in the original dispersion.

The ceramic fibers may also be compressed into mats, sheeting, tape, strip, paper, rope, roving, cloth, etc. Basically, in forming products from these shaped ceramic fibers, it is necessary to saturate or impregnate the fibers with the colloidal silica solution and consolidate the impregnated mass to yield a desirable product. If the material is not consolidated, a more porous and less rigid product is obtained which does not have the requisite strength for some industrial uses.

Figure 2:
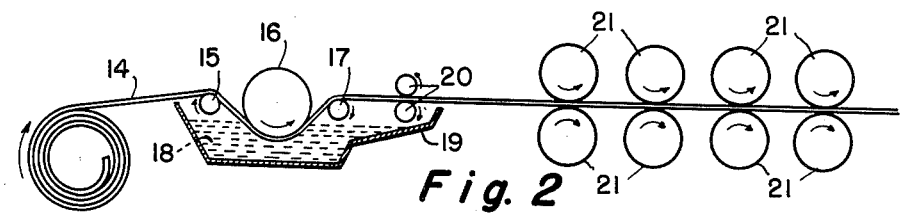
FIGURE 2 is a side view of a production line for bonding sheet ceramic fibers with colloidal silica.

FIGURE 2 illustrates one mode of processing the shaped fibers. A continuous web or mat 14 of ceramic fibers, such as blanket or paper, is fed over intake roll 15, moves downwardly around an immersion roll 16 and upwardly on the side opposite of the immersion roll above another roll 17. The immersion roll 16 is partially immersed in a 30% colloidal silica solution 18 contained in a tank 19. Thus, the ceramic fiber mat is saturated or impregnated with a 30% colloidal silica solution as it moves around the lower surface of roll 16. The web passes between two opposed wringer rolls 20 which squeeze out the excess colloidal silica solution. This excess solution flows back into tank 19 for reuse.

The impregnated ceramic fiber material is dried by passing it between one or more pairs of opposed heated rolls 21 as shown in FIGURE 2.

Alternatively, the impregnated material can be cut into sheets, placed between metallic platens, and pressed while the platens are heated. However, to secure a continuous smooth surface on the finished product, it is desirable to roll the impregnated material repeatedly between opposed rolls.

The material may also be rolled between unheated rolls and then passed to a curing oven where the excess liquid is driven off by heat; however, this does not result in as smooth a surface on the finished product as that developed when the rolls are heated.

The product produced by the above apparatus is a rigid sheet having numerous industrial applications. Normally, a 30% dispersion of silica in water is used for impregnation; but if a more porous, less rigid product is desired, the silica dispersion may be further diluted prior to impregnation.

Forms such as tubes, half-rounds and cones can be made with the silica impregnated fiber mat. Tubing can be made by rolling pliable wet mat on a mandrel or by packing between the walls of concentric cylinders.

The ceramic fiber mat, sheeting, tape, strip, paper, rope, roving, or cloth material is very weak prior to impregnation with colloidal silica and drying; consequently, additional rolls may be necessary to support the ceramic fiber material while moving through the processing apparatus.

The colloidal silica solution normally consists of a dispersion of the silica in water. However, it is within the scope of the present invention to use any vehicle for the colloidal silica which can be removed by drying.

If the impregnated ceramic fiber material is cured or heated in an oven, it has been found that substantially all of the water can be driven out at a temperature of about 500° F. in a period of 15–60 minutes. The temperature at which the impregnated material is heated and the time period during which the heating is continued depends primarily upon the thickness of the material and the type of article being formed.

Figure 3:
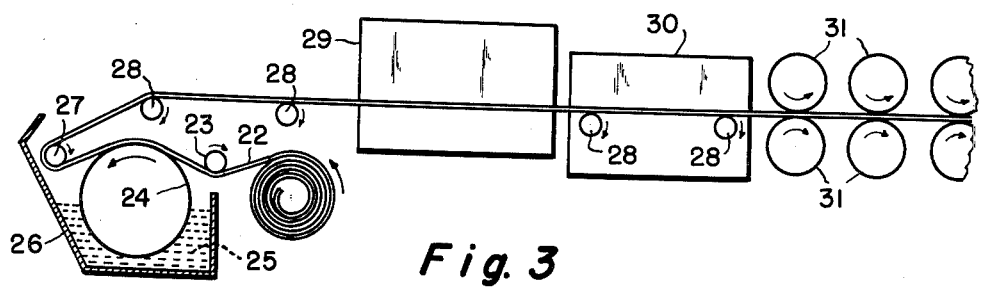
FIGURE 3 is a modification of the production line shown in FIGURE 2.

FIGURE 3 shows a modified form of the invention similar to FIGURE 2 but permitting a greater control over the quantity of colloidal silica solution which is interspersed in the ceramic fiber material. The roll of continuous web or mat 22 of ceramic fibers (paper, mat, strip, tape, felt, cloth, etc.) is fed under a feed roll 23 and upwardly over a powered coating roll 24. The lower surface of the coating roll 24 is immersed in a 30% colloidal silica solution 25 contained in a tank 26. A quantity of the colloidal silica solution adheres to the surface of the coating roll and moves upwardly into contact with the ceramic fiber material when the coating roll rotates. When the actuating mechanism for the coating roll moves it at the same speed and in the same direction as the ceramic fiber material is moving, the fiber mat will have a quantity of colloidal silica deposited thereon equivalent to the material adhering to the surface of the coating roll. However, if the coating roll is rotated at a speed greater than the rate of feed of the ceramic fiber material and in the same direction as the direction of movement of the ceramic fiber material, the colloidal silica solution will be "pumped" into the ceramic fiber material, and thus a more thorough saturation or impregnation of the ceramic fiber material will result.

The impregnated material, after leaving the coating roll, moves around a roll 27 which reverses the direction of movement of the material and permits excess colloidal silica solution to drip or be thrown from the material against an upwardly extending portion of the tank 26. This excess solution of colloidal material returns to the tank for reuse. The impregnated material then moves over one or more carrying rollers 28 into a forming center 29. The impregnated ceramic fiber is molded or shaped in the center 29 in any desirable manner such as by use of dies, molds, rolling, etc. The impregnated fiber may also be retained in flat condition and move through the forming center 29 without any forming operations being performed thereon.

The material, whether shaped or flat, is then moved to a drying oven 30 wherein the water from the silica solution is removed by heat.

An alternative or additional mode of forming and/or drying the impregnated material is shown by the opposed rolls 31 between which the material passes. These rolls may be located at any position in the production line to roll a smooth surface onto the impregnated material. The rolls 31 may be heated or unheated, depending upon the type of surface desired on the material. The rolls can be used either before or after the drying in the oven.

Figure 4:
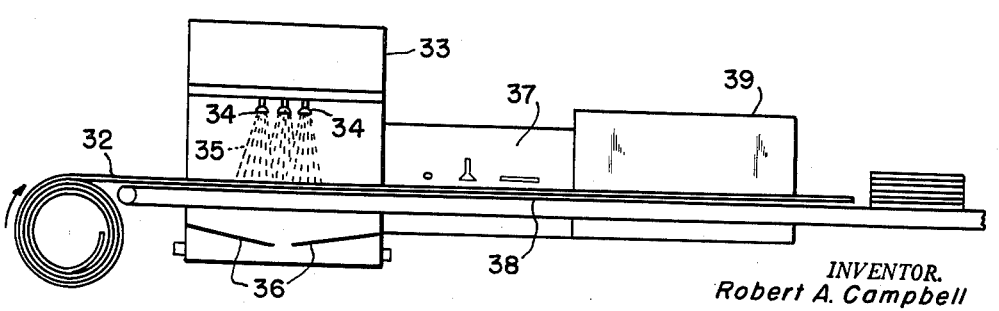
FIGURE 4 is a second modification of the production line shown in FIGURE 2.

Another mode of impregnating and forming the ceramic fiber material is shown in FIGURE 4 wherein a continuous sheet of ceramic fiber material 32 is fed into a spray booth 33 having nozzles 34 therein which deliver a spray 35 of colloidal silica solution onto the ceramic fiber sheet moving through the lower part of the spray booth. The use of spray nozzles permits a very efficient and effective mode of regulating the quantity of colloidal silica solution which is placed on the ceramic fiber sheet. The spray booth is of the conventional type having collection plates 36 in the lower portion which return excess colloidal silica solution for reuse by the nozzles 34.

The impregnated ceramic fiber sheet is then conveyed to a forming center 37 by any conventional type of conveyor means 38 such as rollers. The impregnated ceramic fiber sheet is formed in the forming center in any desirable manner as explained above, or it may be retained in the flat condition if a flat final product is desired. From the forming center, the impregnated ceramic fiber sheet is conveyed to a heated drying oven 39 wherein water from the silica solution is removed. Heated or unheated opposed rolls may be used in the production line in the same manner as explained above to yield a product having smooth surfaces.

It is within the scope of the present invention to dry the impregnated ceramic fibers, whether shaped or flat, temperatures from room temperature to 2000° F. Preferably the drying is accomplished in the temperature range between 400–700° F. However, the ceramic fiber articles can be flash dried for a shorter period of time at temperatures in the range 800–2000° F.

To shape the impregnated ceramic fibers, it is preferable to use molds of metal which have been lined with aluminum foil or coated with silicones to prevent sticking. However, it is within the scope of the present invention to use molds fabricated from materials other than metal and to use coating materials other than aluminum or silicones.

After drying the molded article, the aluminum foil used in the mold will adhere to the article and can be stripped from the finished article or allowed to remain in place if the article is such that the presence of the aluminum foil would be advantageous or not undesirable.

The product produced as described above may be subjected to further processing; for example, the dried product can be sprayed with additional colloidal silica solution and lightly rolled to yield a smooth surface which is substantially water repellent.

The undried impregnated ceramic fibers can be placed between materials such as Fiberglas sheets, plywood or steel plates. The layers are then rolled or pressed together to yield a consolidated structure having surface properties not exhibited by the impregnated ceramic fiber product alone.

To provide extra strength in the finished product, two impregnated ceramic fiber sheets are placed on opposite sides of a woven Fiberglas sheet. The layers are then further saturated with colloidal silica solution and rolled between two rolls and dried to yield a consolidated product. The material can be rolled between heated rolls to remove the water and yield a smooth surfaced, very strong product.

The dried ceramic fiber product can be further processed by waterproofing the surface with any known waterproofing agents.

Porcelain or glaze can be placed on the surface of the dried product and the coated product fused in a kiln to yield a very decorative, but durable, product.

The bonded ceramic fiber product can be reinforced by incorporating wire screening, wires, wire shapes, or similar materials into the product. If the bonded ceramic fiber product is to be used at high temperatures, it is preferable to use titanium wire as reinforcing material. If the bonded ceramic fiber product is to be used at low temperatures, glass fiber, tapes, mats, or thread are used as reinforcing material.

The undried impregnated ceramic fiber material may be placed on or wound around forms to yield many desirable finished products. For example, a narrow tape of impregnated ceramic fiber material may be wound on a pipe form in overlapping relationship and dried thereon to yield a ceramic fiber pipe which is usable at high temperatures.

The following additives can be mixed with the colloidal silica-ceramic fiber composition to obtain additional desirable properties: plaster of Paris, powdered or flaked graphite or carbon, micronized mica, powdered asbestos, Portland cement, powdered ceramic clays and earth, particles of glass, metals, corundum, quartz, etc. About 30 parts by volume of the additive is mixed with 30 parts by volume of ceramic fibers and 40 parts by volume of colloidal silica. Naturally, the quantity of additive used is dependent upon the properties desired in the final product and may vary over a wide range.

When plaster of Paris is added to the ceramic fiber-colloidal silica composition, a stronger, finer grained surface is obtained on the final product. The product can also be coated with colloidal silica, glaze, or porcelain and kiln-dried to yield a desirable decorative article.

The addition of powdered or flaked graphite or carbon yields a product similar to the plaster of Paris article but of much darker color.

Micronized mica is added to the fiber-silica composition when additional heat or electrical insulating properties are desired in the final product.

Powdered asbestos is added to the fiber-silica composition when high insulating and heat resistant properties are desired in the final product. This additive yields a final product having a slight "give" which is necessary in producing gaskets and packings.

Portland cement can be added to the fiber-silica composition to yield a stronger over-all product having a higher crushing strength.

The impregnated ceramic fiber sheet is an ideal material for forming reusable molds for the rapid production of metal castings in the foundry industry. It is particularly suitable for nonferrous casting such as aluminum or brass. It may also be used for iron or steel castings, although the temperatures of these metals in the molten pouring state are much higher than aluminum or brass.

To fabricate a reusable foundry mold, a wooden or metal pattern is made of the object to be cast. The pattern is positioned on a mold board and covered with aluminum foil or silicones to prevent adherence of the impregnated ceramic fiber to the pattern. A blanket of impregnated ceramic fiber is pressed firmly over the covered pattern. In some cases, it is necessary to use several layers of impregnated ceramic fiber to secure rigidity in the reusable mold. The impregnated ceramic fiber is very plastic and conforms to every mark and shape of the pattern. The ceramic fiber is left on the pattern while it is air-dried, heated in an oven, or heated over an open flame to remove the water by vaporization. The final product is a hard ceramic fiber mat which retains the exact shape of the pattern.

The ceramic fiber mold is removed from the pattern and placed on a molding board. A molding box is placed over the board and ceramic fiber mold; and reinforcing sand is tamped into the box. The sand supports the ceramic fiber mold and prevents breakage when metal is poured therein.

If a two-part mold is used, the above procedure is repeated for the top half of the mold and the two half sections of the mold are brought together so that the center section of the mold contains the two ceramic fiber molds. Thus, the ceramic fiber molds form a continuous cavity having the shape of the articles to be produced. Openings are made into the ceramic fiber molds to permit the introduction of the molten metal in the conventional manner.

Molten metal is poured into the mold, allowed to cool, the two sections of the mold are carefully separated, and the metal casting gently removed from the ceramic fiber mold. The mold is thus left intact so that it can be reused.

The metal may stick slightly to the ceramic fiber molds, in which case, some talcum or silica powder is dusted over the mold before it is used to avoid sticking.

The ceramic fiber mold is ideal for casting metals for numerous reasons: (1) it can withstand very high temperatures: (2) the ceramic fiber mold can be easily formed around a pattern and readily conforms to any shape; (3) the cavity of the ceramic fiber mold has a smooth surface, thus reducing the finishing time required on the casting; and (4) the ceramic fiber mold is porous, thus permitting gases from the molten metal to pass away from the casting to avoid holes and pockets in the casting.

EXAMPLE 1

50 parts by volume of ceramic fibers were mixed with 25 parts by volume of a colloidal silica dispersion by means of a paddle mixer to yield a white colored, substantially homogeneous mixture. The colloidal silica dispersion was a 10% dispersion of colloidal silica in water. The mixture was transferred to a metal mold with an open top. The sides and bottom of the mold were lined with aluminum foil. The mixture was tamped in the mold to insure removal of air bubbles and adequate filling of the mold. The filled mold was then placed in an oven for one hour at 500° F. The dried ceramic fiber shape was removed from the mold and the foil stripped from the bottom and sides of the shape. The shape was 2" x 1" x 10" and appeared to have uniform composition throughout.

EXAMPLE 2

Ceramic fiber mat was placed on an endless belt conveyor which passed through a spray booth. Nozzles were positioned over the conveyor belt and as the ceramic mat passed underneath, the nozzles sprayed colloidal silica solution onto the mat material. The saturated mat was then conveyed to an oven where it was heated for 45 minutes at 500° F. After drying in the oven, the mat was cut into sheets for subsequent use.

EXAMPLE 3

The fiber-silica composition used was similar to that recited in Example 1 above. The mold was coated with silicones to prevent sticking. The wet impregnated ceramic fibers were fed from a mixing vat by gravity into the mold. The mold was then vibrated and tamped to remove air pockets and insure an adequate filling of the mold. The top of the mold was scraped level. The filled mold was then conveyed to an oven where it was heated for one hour at 500° F. After baking, the finished product was removed from the mold for subsequent use.

The bonded ceramic fiber material is adaptable for use in high temperature gaskets and packing since it has sufficient "give" to allow take-up in such material. Impregnated ceramic material also is excellent for insulation, both heat and electrical, on wires or boilers. The material may also be used in high speed missiles wherein high temperature resistance is desired.

The major advantage of colloidal-silica-bonded ceramic fiber insulation as produced by the present invention is that it has high strength and low shrinkage after firing at 2300° F. in comparison to properties of known insulation materials.

A further use for the ceramic fiber material is in producing sound deadening, fireproofing, or insulating material. Many objects and surfaces can be coated by spraying a composition comprising, by volume, 60% ceramic fiber-40% colloidal silica dispersion thereon, using a conventional spray gun mechanism. The coated article can be air dried, heated in an oven, or dried with infrared lamps.

If desired, the finished product can have a substantially impervious surface and/or a smooth, lustrous surface. Thus, the decorative uses for the products of the present invention are unlimited.

While I have described a present preferred embodiment of my invention, it is to be understood that it may be otherwise embodied within the scope of the following claims.

I claim:

1. A casting mold having inner conforming walls that have the smooth surface that is characteristic of a body made by wet molding, and that consist essentially of a rigid, monolithic molded layer of a hardened, substantially homogenous mass of silica-bonded ceramic fibers, the silica comprising at least about 10% by weight of the fiber, dry basis.

2. A casting mold having inner conforming walls that have the smooth surface that is characteristic of a body made by wet molding, and consisting essentially of a rigid, monolithic molded layer of a hardened substantially homogenous mass of silica-bonded aluminum silicate fibers, the silica comprising at least about 10% by weight of the fiber, dry basis.

3. An article of manufacture having a surface coating bonded thereon, said coating consisting essentially of a rigid, monolithic, molded layer of a hardened, substantially homogenous mass of silica-bonded ceramic fibers, the silica comprising at least about 10% by weight of the fiber, dry basis.

4. An article of manufacture having a surface coating bonded thereon, said coating consisting essentially of a rigid, monolithic, molded layer of a hardened substantially homogenous mass of silica-bonded aluminum silicate fibers, the silica comprising at least about 10 percent by weight of the fiber, dry basis.

References Cited in the file of this patent

UNITED STATES PATENTS

| | | |
|---|---|---|
| 304,976 | Traylor | Sept. 9, 1884 |
| 694,566 | Michailoff | Mar. 4, 1902 |
| 813,605 | Weyer | Feb. 27, 1906 |
| 2,054,549 | Smith | Sept. 15, 1936 |
| 2,192,789 | Harter | Mar. 5, 1940 |
| 2,237,337 | Collier et al. | Apr. 8, 1941 |
| 2,329,589 | Carter | Sept. 14, 1943 |
| 2,380,945 | Collins | Aug. 7, 1945 |
| 2,633,428 | Klug | Mar. 31, 1953 |
| 2,649,388 | Wills et al. | Aug. 18, 1953 |
| 2,757,426 | Brennan | Aug. 7, 1956 |
| 2,809,898 | Thiess | Oct. 15, 1957 |
| 2,824,348 | Williams | Feb. 25, 1958 |
| 2,917,426 | Bugosh | Dec. 15, 1959 |

FOREIGN PATENTS

| | | |
|---|---|---|
| 575,734 | Great Britain | Mar. 4, 1946 |
| 580,058 | Great Britain | Aug. 26, 1946 |
| 672,535 | Great Britain | Mar. 21, 1952 |
| 753,228 | Great Britain | July 18, 1956 |

OTHER REFERENCES

Ser. No. 436,541, Passelecq (A.P.C.), published May 11, 1943.